(12) United States Patent
Henry

(10) Patent No.: US 9,812,029 B1
(45) Date of Patent: Nov. 7, 2017

(54) EVALUATING A POSITION OF A MUSICAL INSTRUMENT

(71) Applicant: Brianna Henry, Richardson, TX (US)

(72) Inventor: Brianna Henry, Richardson, TX (US)

( * ) Notice: Subject to any disclaimer, the term of this patent is extended or adjusted under 35 U.S.C. 154(b) by 0 days.

(21) Appl. No.: 15/291,664

(22) Filed: Oct. 12, 2016

(51) Int. Cl.
*G09B 15/00* (2006.01)
*G10G 7/00* (2006.01)
*G08B 3/00* (2006.01)
*G08B 5/36* (2006.01)
*G08B 6/00* (2006.01)

(52) U.S. Cl.
CPC ............... *G09B 15/00* (2013.01); *G10G 7/00* (2013.01); *G08B 3/00* (2013.01); *G08B 5/36* (2013.01); *G08B 6/00* (2013.01)

(58) Field of Classification Search
CPC ...................................................... G09B 15/00
USPC ........................................ 84/470 R, 281, 465
See application file for complete search history.

(56) References Cited

U.S. PATENT DOCUMENTS

| | | | | |
|---|---|---|---|---|
| 3,291,888 A * | 12/1966 | Meazzi | ............. | G10H 1/14 84/726 |
| 3,726,175 A * | 4/1973 | Kaplan | ............. | G09B 15/06 84/281 |
| 3,726,177 A * | 4/1973 | Kaplan | ............. | G10D 3/16 84/283 |
| 4,962,688 A * | 10/1990 | Suzuki | ............. | G10H 1/00 84/600 |
| 5,105,708 A * | 4/1992 | Suzuki | ............. | G10H 1/00 84/600 |
| 5,170,002 A * | 12/1992 | Suzuki | ............. | G10H 1/00 84/600 |
| 5,177,311 A * | 1/1993 | Suzuki | ............. | G10H 1/00 84/600 |
| 5,290,964 A * | 3/1994 | Hiyoshi | ............. | G06F 3/014 84/600 |
| 5,422,956 A * | 6/1995 | Wheaton | ............. | H04R 3/00 381/122 |
| 5,541,358 A * | 7/1996 | Wheaton | ............. | G10H 1/00 84/645 |
| 5,908,996 A * | 6/1999 | Litterst | ............. | G10H 1/34 200/56 A |
| 6,198,034 B1 * | 3/2001 | Beach | ............. | G10H 1/0083 84/407 |
| 6,297,438 B1 * | 10/2001 | Por Paul | ............. | G10H 1/32 446/397 |
| 6,861,582 B2 * | 3/2005 | Street | ............. | G10H 3/186 84/600 |
| 7,294,777 B2 * | 11/2007 | Hofmeister | ............. | G10H 1/0083 310/329 |
| 7,297,862 B2 * | 11/2007 | Nishitani | ............. | G10H 1/00 84/609 |
| 7,385,125 B2 * | 6/2008 | Motsenbocker | ............. | G10H 3/185 84/10 |

(Continued)

*Primary Examiner* — David Warren
(74) *Attorney, Agent, or Firm* — Baker Botts L.L.P.

(57) ABSTRACT

A system comprises a position analyzer, an output component, and a fastener. The position analyzer is configured to monitor a position of the musical instrument and generate an alert when the position of the musical instrument is outside of an allowed deviation from a reference position. The output component may be configured to present the alert. The alert may be at least one of a set comprising a visual alert, an audio alert, a tactile alert, and an electrical signal. The fastener is configured to couple the position analyzer to the musical instrument.

19 Claims, 3 Drawing Sheets

(56) References Cited

U.S. PATENT DOCUMENTS

| | | | | |
|---|---|---|---|---|
| 7,528,318 B2* | 5/2009 | Nishitani | G10H 1/00 | |
| | | | 84/723 | |
| 7,842,875 B2* | 11/2010 | Villa | A63F 13/00 | |
| | | | 84/609 | |
| 7,935,876 B1* | 5/2011 | West | G10D 3/146 | |
| | | | 84/200 | |
| 8,079,901 B2* | 12/2011 | Brosius | A63F 13/06 | |
| | | | 463/37 | |
| 8,084,678 B2* | 12/2011 | McMillen | G10D 3/16 | |
| | | | 84/282 | |
| 8,419,516 B2* | 4/2013 | Masuda | G10H 1/342 | |
| | | | 463/1 | |
| 8,686,269 B2* | 4/2014 | Schmidt | G10H 1/342 | |
| | | | 84/477 R | |
| 8,723,012 B2* | 5/2014 | Mizuta | A63F 13/814 | |
| | | | 84/600 | |
| 9,061,205 B2* | 6/2015 | Chrzanowski, Jr. | A63F 13/10 | |
| 9,269,340 B2* | 2/2016 | Udell, III | G10H 1/0091 | |
| 9,390,630 B2* | 7/2016 | Daniels | G09B 15/00 | |
| 2003/0041721 A1* | 3/2003 | Nishitani | G10H 1/00 | |
| | | | 84/609 | |
| 2003/0101863 A1* | 6/2003 | Street | G10H 1/0558 | |
| | | | 84/723 | |
| 2004/0040434 A1* | 3/2004 | Kondo | G10H 1/14 | |
| | | | 84/604 | |
| 2006/0144212 A1* | 7/2006 | Hofmeister | G10H 1/0083 | |
| | | | 84/724 | |
| 2007/0000375 A1* | 1/2007 | Harrison, Jr. | G04B 25/00 | |
| | | | 84/737 | |
| 2007/0270217 A1* | 11/2007 | Rabin | A63F 13/06 | |
| | | | 463/37 | |
| 2008/0034949 A1* | 2/2008 | Nishitani | G10H 1/00 | |
| | | | 84/735 | |
| 2009/0104956 A1* | 4/2009 | Kay | A63F 13/10 | |
| | | | 463/7 | |
| 2009/0216483 A1* | 8/2009 | Young | G10H 1/46 | |
| | | | 702/138 | |
| 2009/0308232 A1* | 12/2009 | McMillen | G10D 3/16 | |
| | | | 84/723 | |
| 2010/0009749 A1* | 1/2010 | Chrzanowski, Jr. | A63F 13/10 | |
| | | | 463/35 | |
| 2011/0034247 A1* | 2/2011 | Masuda | G10H 1/342 | |
| | | | 463/35 | |
| 2011/0197333 A1* | 8/2011 | Liotta | H04R 1/1033 | |
| | | | 2/90 | |
| 2014/0090547 A1* | 4/2014 | Udell, III | G10H 1/0091 | |
| | | | 84/626 | |
| 2015/0265930 A1* | 9/2015 | Chrzanowski, Jr. | A63F 13/10 | |
| | | | 463/35 | |
| 2016/0114221 A1* | 4/2016 | Binder | A63H 33/18 | |
| | | | 473/570 | |
| 2016/0114257 A1* | 4/2016 | Binder | A63H 33/18 | |
| | | | 446/175 | |
| 2016/0125864 A1* | 5/2016 | Udell, III | G10H 1/0091 | |
| | | | 84/615 | |
| 2016/0343362 A1* | 11/2016 | Brosius | G10H 1/0016 | |

* cited by examiner

EVALUATING A POSITION OF A MUSICAL INSTRUMENT

TECHNICAL FIELD

This disclosure relates generally to musical instruments. More particularly, this disclosure relates to a device for evaluating a position of a musical instrument.

BACKGROUND

Posture is important when playing certain types of musical instruments. Maintaining posture may include, for example, holding a musical instrument in a certain position. Holding a musical instrument in a position may include, for example, properly orienting the musical instrument relative to the operator playing the musical instrument. Holding a musical instrument in an incorrect position may make playing the musical instrument more difficult. For example, incorrect positioning of the musical instrument may cause inconsistent playing, pain, fatigue, or, in some cases, injury.

SUMMARY OF THE DISCLOSURE

According to one embodiment, a system comprises a position analyzer, an output component, and a fastener. The position analyzer is configured to monitor a position of the musical instrument and generate an alert when the position of the musical instrument is outside of an allowed deviation from a reference position. The output component may be configured to present the alert. The alert may be at least one of a set comprising a visual alert, an audio alert, a tactile alert, and an electrical signal. The fastener is configured to couple the position analyzer to the musical instrument.

Technical advantages of certain embodiments may include detecting when an operator of a musical instrument is holding the musical instrument in an undesired position. As another example, certain embodiments may include signaling to a user, without disrupting the user, when the operator is holding the musical instrument in an undesired position. As yet another example, certain embodiments may include recording position information of the musical instrument and storing the position information. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Holding a musical instrument in a proper position may improve an operator's consistency of position (e.g., muscle memory) and ease of playing. Although proper positioning is associated with these and other benefits, an instrument operator may not be able to detect when his or her positioning is proper because the operator's focus is being pulled in different directions (e.g., reading sheet music and playing correct notes). As a result, an operator is traditionally alerted of his or her improper positioning by a third party such as a music teacher or an audience member. Accordingly, an operator of a musical instrument may benefit from a device configured to evaluate the position of the musical instrument and alert the operator when the musical instrument is being held in an improper, or undesired, position.

The teachings of this disclosure recognize using a device to alert a user when the operator of an instrument is holding the instrument in an undesired position. Using such device may result in various benefits including, but not limited to, being able to detect improper instrument positioning without involving a third party. Additionally, such device may be associated with benefits such as prevention of inconsistent and/or improper instrument positioning and decreased fatigue, and/or injury due to inconsistent and/or improper positioning. Therefore, systems and methods for evaluating a position of a musical instrument to provide these and other desired features are described below.

Figure 1:
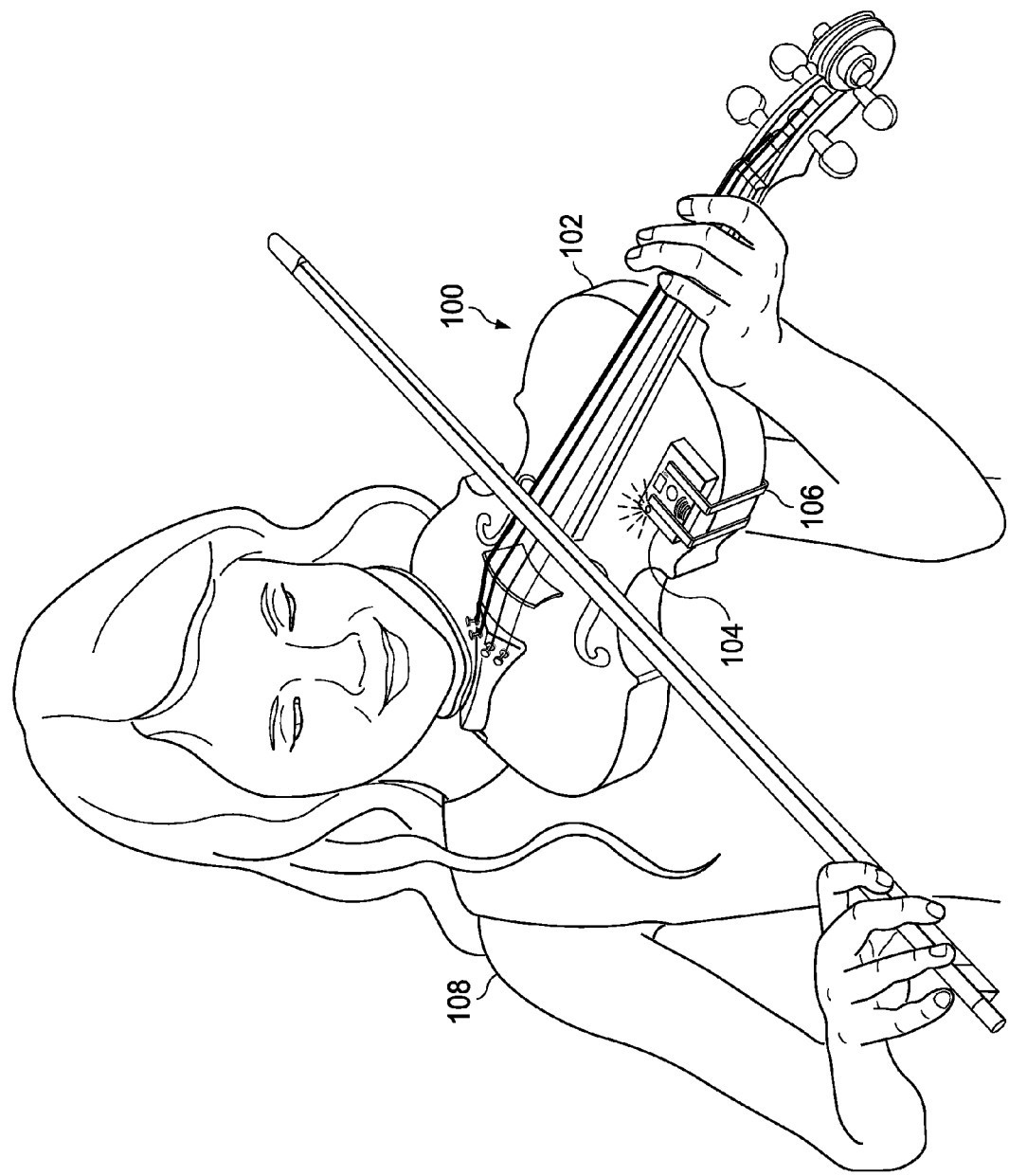
FIG. 1 illustrates an assembly including an instrument and a system for evaluating a position of an instrument, according to certain embodiments.
Figure 2:
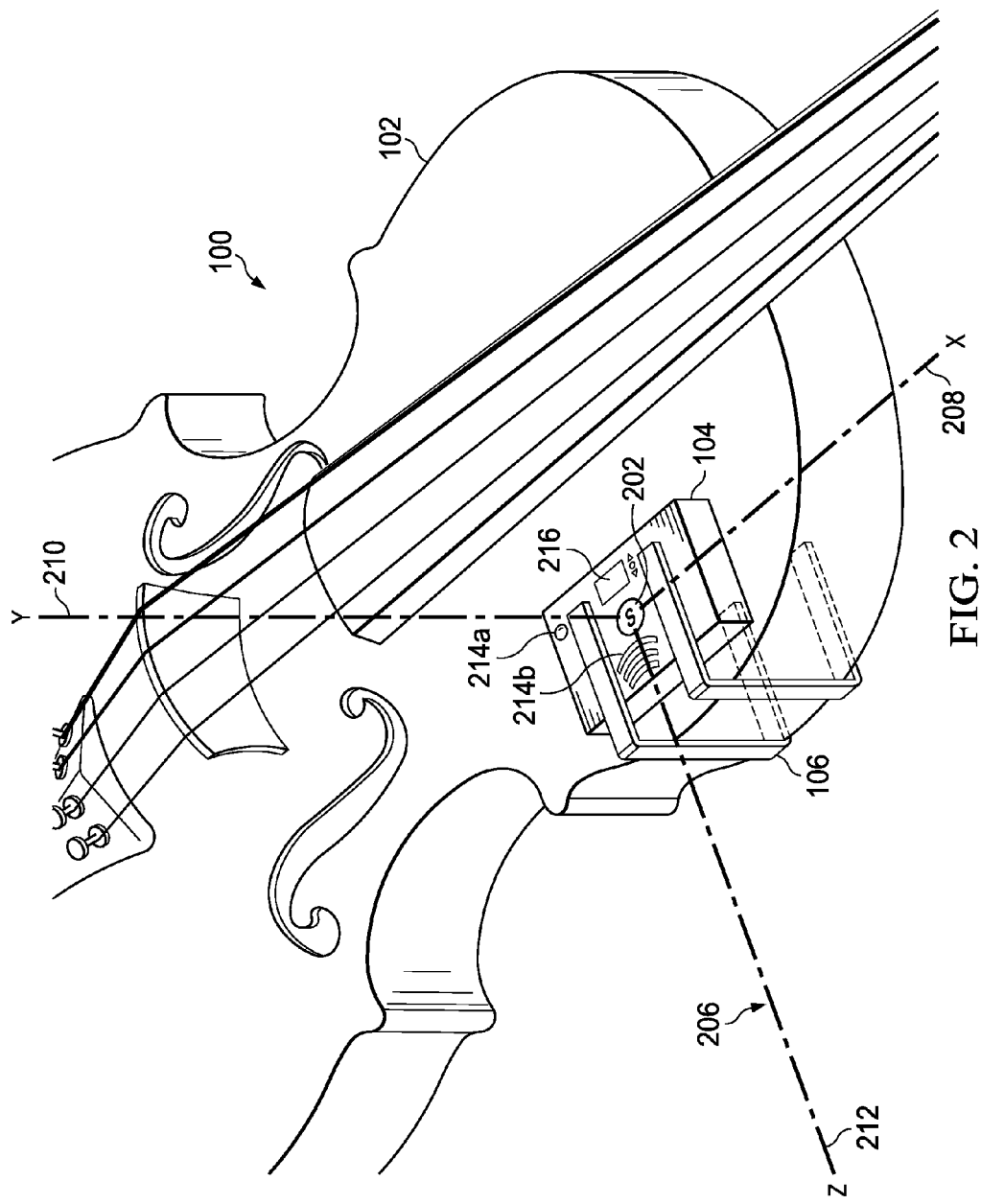
FIG. 2 illustrates an enlarged view of the assembly of FIG. 1, according to certain embodiments.

FIGS. 1-2 illustrate an assembly 100 comprising a device for evaluating a position of an instrument fastened to a musical instrument, according to certain embodiments. As depicted in FIGS. 1 and 2, assembly 100 may include an instrument 102, a device 104, and a fastener 106. Assembly 100 may be operated by an operator, such as operator 108 of FIG. 1. Generally, operator 108 may utilize device 104 to evaluate whether operator 108 is holding instrument 102 in a proper, or desired, position. Notifying operator 108 that instrument 102 is in an undesired position may allow operator 108 to correct his/her holding position, thereby reducing the possibility of inconsistent playing, pain, fatigue, and injury.

Generally, device 104 may be configured to determine whether operator 108 is holding instrument 102 in a desired position. In some embodiments, determining whether operator 108 is holding instrument 102 in a desired position comprises receiving information about a position of instrument 102, a reference position, and an allowed deviation. Based on the received information, device 104 may determine whether the position of instrument 102 falls within the allowed deviation of the reference position. If it does not, the position of instrument 102 can be said to be improper. If the position of instrument 102 is improper, device 104 may generate an alert and present the alert to a user of device 104 (e.g., operator 108 or a music instructor). In some embodiments, the alert is presented via one or more output components 214.

As described above, assembly 100 includes an instrument 102 in some embodiments. Instrument 102 may be a musical instrument. As depicted in FIGS. 1-2, instrument 102 is a violin. Although this disclosure depicts and describes instrument 102 as a violin, this disclosure recognizes that instrument 102 may be any suitable instrument including, without limitation, a guitar, a cello, a viola, a flute, a trumpet, a recorder, a harp, or any other suitable instrument.

Assembly 100 also includes a device 104 in some embodiments. Device 104 may be coupled to instrument 102 using fastener 106 in some embodiments. Generally, device 104 is operable to evaluate the position of instrument 102. In some embodiments, evaluating the position of instrument 102 comprises determining whether operator 108 is holding instrument 102 in a desired (or proper) position and, if not, alerting a user of device 104 that operator 108 is holding instrument 102 in an undesired position.

As described above, device 104 may be configured to evaluate the position of instrument 102, generate an alert when operator 108 is holding instrument 102 in an undesired position, and present the alert to a user of device 104. In some embodiments, the position evaluating and the generating of the alert is performed by a position analyzer. In some embodiments, evaluating the position of instrument 102 comprises monitoring the position of instrument 102 and making a determination about the position of instrument 102 (e.g., determining whether the received information is within an allowed deviation from a reference point). Monitoring, by the position analyzer, may include receiving information about the position of instrument 102. The position analyzer may monitor the position of instrument 102 continuously or periodically. For example, without limitation, the position analyzer may identify the position of instrument 102 at the lapse of a timer (e.g., at the expiration of one minute), at predefined intervals (e.g., every one minute), in response to an occurrence of a preselected event (e.g., an identification that operator 108 has performed a song), or at the beginning or end of any other suitable period.

As described above, position analyzer may be configured to make determinations about the position of instrument 102. For example, position analyzer may be configured to determine whether the position of instrument 102 is proper. Such a determination may be based on the information received from monitoring the position of instrument 102. In some embodiments, position analyzer may generate an alert in response to determining that the position of instrument 102 is improper. Position analyzer may also be configured to transmit a generated alert to one or more output components (e.g., output components 214 of FIG. 2) of device 104. As an example, position analyzer may be configured to transmit the alert to output component 214 as an electrical signal. As another example, position analyzer may be configured to send an alert to output component 214 using at least one of a wireless communications link, a wired communications link, an optical communications link, or any other suitable communications link.

The position analyzer may comprise or be a mercury tilt switch in some embodiments. Generally, a mercury tilt switch is an electric switch that includes mercury and one or more metal electrodes. The switch may open and close an electrical circuit as the mercury contacts the electrodes (e.g., when the switch is tilted). Accordingly, the mercury tilt switch may be capable of detecting changes in orientation. As applicable to the current disclosure, when coupled to instrument 102, a mercury tilt switch may detect changes in the orientation of instrument 102. For example, when the mercury tilt switch is in a first position (e.g., a desired position of instrument 102), the electrical circuit may be open. Tilting instrument 102 to a second position (e.g., an undesired position of instrument 102) may cause the mercury to contact the metal electrodes, thereby closing the electrical circuit. In some embodiments, closing the electrical circuit may cause an alert to be generated. For example, the alert may be an electrical signal that is sent through the electrical circuit to an output component 214.

In other embodiments, the position analyzer may comprise various components such as one or more sensors, a memory, a processor, and one or more interfaces 216. As a nonlimiting example, position analyzer may be a computer such as computer 400 depicted in FIG. 4. As depicted in FIG. 2, position analyzer comprises a sensor 202 configured to detect information about a position of instrument 102. Sensor 202 may be configured to detect position information that directly identifies or may be used to identify a location of instrument 102, an orientation of instrument 102, or both. Sensor 202 may be configured to detect a change in position relative to at least one axis (e.g., x-axis) which is defined relative to a reference position. Sensor 202 may also be configured to detect a change in position for the six degrees of freedom (e.g., roll (about an x-axis), yaw (about a y-axis), and pitch (about a z-axis)). Sensor 202 may be or comprise one or more accelerometers, gyroscopes, electromagnetic sensors, ultrasonic sensors, transducers, markers, any other suitable sensor device, or a combination thereof. In some embodiments, the one or more sensors (e.g., sensor 202) may be communicatively coupled to other components of device 104. For example, the one or more sensors may be communicatively coupled to a processor, a memory, and one or more interfaces 216 of the position analyzer.

As described above, the position analyzer may comprise a memory in some embodiments. The memory may be communicatively coupled to one or more components of device 104. For example, the memory may be communicatively coupled to the one or more sensors of device 104 (e.g., sensor 202) and/or a processor. In some embodiments, the memory is configured to store information detected by one or more sensors (e.g., sensor 202 of FIG. 2) of device 104. In some embodiments, the memory is also configured to store a reference position and an allowed deviation. In other embodiments, the memory is configured to store a plurality of reference positions and/or a plurality of allowed deviations.

As used herein, a reference position refers to a desired (or proper) position of instrument 102 and an allowed deviation refers to an acceptable variance from a reference position. As described above, the memory may store one or more reference positions and/or one or more allowed deviations in embodiments where position analyzer comprises a memory. In embodiments where position analyzer is or comprises a mercury tilt switch, a reference position may correspond to an orientation of the mercury tilt switch wherein the mercury does not contact a metal electrode (e.g., mercury is equally positioned between two metal electrodes of the mercury tilt switch). The allowed deviation in a mercury tilt switch may correspond to one or more of the size of the mercury tilt switch or the volume of mercury within the mercury tilt switch. In some embodiments, the position analyzer may determine whether instrument 102 is being held in a desired position based on the one or more reference positions and the one or more allowed deviations. Determining whether a particular position of instrument 102 is proper or improper will be described in more detail below in reference to FIG. 3.

The position analyzer may comprise a processor in some embodiments. In such embodiment, the processor may be communicatively coupled to one or more components of device 104 including the one or more sensors (e.g., sensor 202 of FIG. 2), a memory (e.g., memory as described above), and one or more interfaces 216. As such, the processor may be configured to receive information about the position of instrument 102, one or more reference positions, and one or more allowed deviations. In some embodiments, the processor is configured to receive information about a particular reference position and/or a particular allowed deviation. For example, in some embodiments, device 104 may comprise one or more interfaces 216 configured to permit a user of device 104 to select a particular reference position from a plurality of reference positions and/or a particular allowed deviation from a plurality of allowed deviations. The one or more interfaces 216 may allow a user to store a reference position, for example, by orienting instrument 102 in a desired position and engaging the one or more interfaces 216. As an example, a user of device 104 (e.g., operator 108 and/or music instructor) may select a particular reference position and/or a particular allowed deviation from the one or more stored reference positions and/or stored allowed deviations. A particular reference position and/or allowed deviation may be selected based on at least one of the musical instrument 102 (e.g., type of musical instrument, size of musical instrument), an identity of operator 108, an age of operator 108, a level of skill of operator 108, or any other suitable factor. In particular embodiments, an allowed deviation may be determined based on monitoring the position of instrument 102 for a period of time. For example, a user may play instrument 102 for 20 minutes and an allowed deviation may be determined based the monitored position of instrument 102 over the 20 minute time interval.

The processor may also be configured to receive information about the position of operator 108 in some embodiments. For example, in some embodiments, one or more sensors may be coupled to operator 108 (not depicted) and be configured to detect information about the position of operator 108. As an example and not by way of limitation, one or more sensors may be coupled to operator by affixing the one or more sensors to the clothes of operator 108 or on/in a glove worn by operator 108. The one or more sensors configured to detect information about the position of operator 108 may be or comprise one or more accelerometers, one or more gyroscopes, one or more electromagnetic sensors, one or more ultrasonic sensors, one or more transducers, one or more markers, any other suitable sensor device, or a combination thereof. The detected information may be information that directly identifies, or may be used to identify, a location of operator 108, an orientation of instrument 102, or both. The one or more sensors configured to detect information about the position of operator 108 may further be configured to detect a change in position relative to at least one axis (e.g., x-axis). and/or changes in position for the six degrees of freedom.

The processor may also be the component of position analyzer that is configured to determine whether the position of instrument 102 is proper. In some embodiments, determining whether the position of instrument 102 is proper may comprise determining whether the position of instrument 102 is within the allowed deviation from the reference position. In some embodiments, this determination may comprise determining a range of allowable positions for instrument 102 and determining whether the position of the musical instrument comprises one of the allowable positions. The processor may determine that the position of instrument 102 is proper based on one or more of a reference position, an allowed deviation, position information about the position of instrument 102, and position of operator 108. In certain embodiments, the reference position and/or the allowed deviation is one that has been selected by a user of device 104 (e.g., operator of instrument or music instructor selects, from one or more interfaces 216 of device 104, a particular reference position and an allowed deviation).

Figure 3:
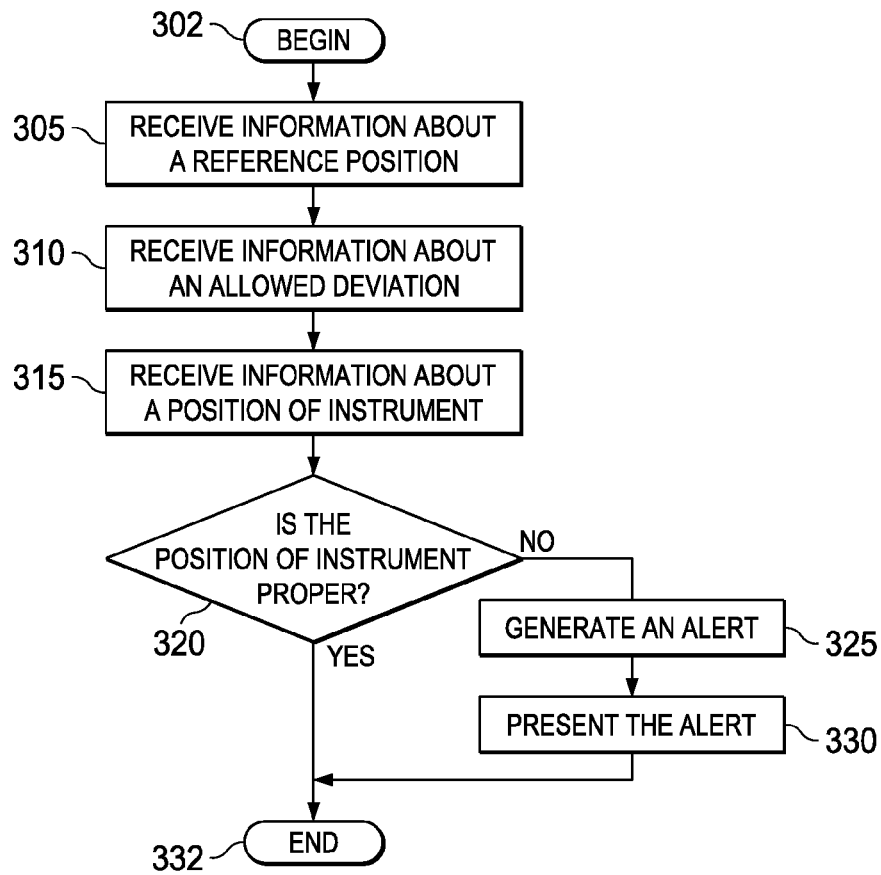
FIG. 3 illustrates a method for evaluating a position of a musical instrument with the system of FIG. 1, according to certain embodiments.

Determining whether a particular position of instrument 102 is proper or improper will be described in more detail below in reference to FIG. 3.

The processor may be further configured to generate an alert in response to determining that the position of instrument 102 is improper. In some embodiments, the processor is configured to generate an alert only after instrument 102 has been in the improper position for a particular period of time (e.g., 10 seconds). In other embodiments, the processor may be configured to generate an alert when instrument 102 has been held in an improper position a particular number of times within a particular period of time (e.g., five times in three minutes). The alert may be at least one of a visual alert (e.g., a light), an audio alert (e.g., a tone), a tactile alert (e.g., a vibration), or an electrical signal.

As described above, device 104 may also comprise one or more output components 214 which may be configured to present the generated alert to a user (e.g., operator 108 and/or music instructor). In this manner, a user of device 104 may readily identify when operator 108 is holding instrument 102 in an undesired position. Output component 214 may also be or comprise a visual device, an audio device, and/or a tactile device. As depicted in FIG. 2, device 104 comprises two output components—a light 214a (visual device) and a speaker 214b (audio device). Output component 214 may be integrated with position analyzer as part of a single unit (e.g., as depicted in FIG. 2). Alternatively, position analyzer and output component 214 may comprise separate units. For example, output component 214 may be physically connected to position analyzer via a cable and position analyzer may transmit generated signals via the cable. As another example, output component 214 may be remotely located from position analyzer and position analyzer may wirelessly transmit generated signals to output component 214. Depending on the implementation, output component 214 may be coupled to instrument 102, coupled to operator 108, placed in a location that is away from instrument 102 but visible to operator 102 (e.g., a music stand), or placed in any suitable location.

The alert may be presented in a manner that indicates the severity of the improper holding of instrument 102. In some embodiments, severity of improper holding is based on an identified deviation from the reference position. As an example, output component 214a may change colors depending on the severity of the improper holding (e.g., output component 214a may emit a light of a first color (e.g. yellow) when the position of instrument 102 is only slightly outside (e.g., +/−5°) the allowed deviation and emit a light of a second color (e.g., red) when the position of instrument 102 is further outside (e.g., +/−5+°) the allowed deviation). As another example, output component 214b may change the volume of an audio tone based on the severity of the improper holding (e.g., tone becomes louder as position of instrument 102 gets further away from the reference position).

In some embodiments, output component 214 may comprise a display device (e.g., light 214a), an audio device (e.g., speaker 214b), a tactile device, or any suitable device. As mentioned above, device 104 may comprise one or more output components. As used herein, a display device may be any device capable of presenting a visual alert. For example, without limitation, a display device may be a light-emitting diode (LED), a computer monitor, a liquid crystal display (LCD), a mobile device, or any other suitable device capable of presenting visual information in response to receiving an alert from the position analyzer. In contrast, an audio device 216 may be any device capable of presenting an audio alert.

For example, without limitation, audio device 214 may be a speaker, a pair of headphones, an earbud headphone, or any other suitable device capable of generating a sound in response to receiving an alert from the position analyzer. As used herein, a tactile device may be any device capable of presenting a tactile alert using, for example, vibration. The tactile device may be, for example, without limitation, a mobile phone, tablet, or a laptop, and/or a motor capable of creating vibrations in response to receiving an alert from position analyzer. Although this disclosure describes and depicts various configurations of output component 214, this disclosure recognizes that output component 214 may be any suitable device configured to present a generated alert.

In some embodiments, such as depicted in FIGS. 1 and 2, assembly 100 also include a fastener 106. Fastener 106 may be configured to couple device 104 to instrument 102. As depicted in FIGS. 1 and 2, fastener 106 is a clamp. In other embodiments, fastener 106 may be and/or may comprise a clamp, a hook-and-loop fastener, a hook-and-eye fastener, a clip, a clasp, a clutch, adhesive material, or any other suitable fastener configured to couple device 104 to instrument 102. Although this disclosure describes and depicts particular ways of coupling device 104 to instrument 102, this disclosure recognizes that coupling device 104 to instrument 102 may be achieved in any suitable manner.

As mentioned above, an operator 108 may operate one or more of instrument 102 and device 104 in some embodiments. Operator 108 may be any level of musician. For example, operator 108 may be a novice musician or an expert musician. This disclosure recognizes that musicians of any level may realize benefits from operating instrument 102 with device 104. For example, a novice musician may use device 104 to learn proper positioning for holding instrument 102. As another example, an expert musician may use device 104 to ensure that (s)he uses proper positioning while practicing and/or playing instrument 102. Although this disclosure has described particular types of operators, this disclosure recognizes that operator 108 may be an suitable operator including, without limitation, a music instructor/trainer and a music trainee.

Figure 4:
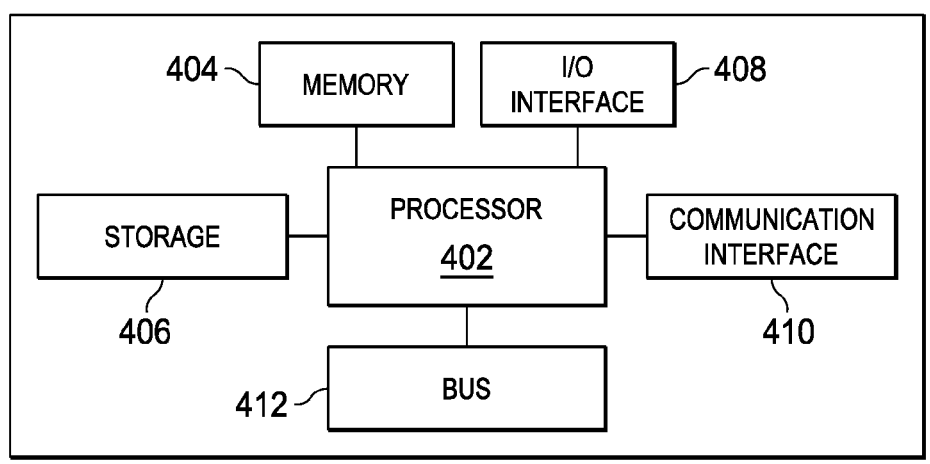
FIG. 4 illustrates a computer system configured to implement the method of FIG. 3.

Generally, device 104 is used to readily identify when operator 108 is holding instrument 102 in an undesired position. FIG. 3 illustrates an embodiment of a method for evaluating a position of instrument 102 with device 104 and FIG. 4 illustrates an example of a computer system configured to perform the method of FIG. 3.

In operation, operator 108 may couple device 104 to instrument 102 using fastener 106. In some embodiments, device 104 is preprogrammed with a reference position and an allowed deviation and is ready for operation once coupled to instrument 102. In other embodiments, device 104 may be configured to receive a reference position from one or more interfaces 216. For example, a teacher may assist and/or instruct operator 108 in holding instrument 102 in a desired position and selectively record (or set) the desired position as the reference position. The selectively recorded position may be saved to the memory of device 104. In some embodiments, user of device 104 may choose, using an interface (e.g., interface 216 of FIG. 2), one of a plurality of reference positions and/or one of a plurality of allowed deviations. As an example, user of device 104 may select the selectively recorded reference position and a particular allowed deviation, wherein the particular allowed deviation permits 5° changes in the position of instrument 102 along the x, y, and z axes (axes 208, 210, 212 of FIG. 2). After selecting a particular reference position and a particular allowed deviation, operator 108 may begin to play instrument 102. Upon detecting that the position of instrument 102 is 5+° from the particular reference position along any of the x, y, or z-axes, device 104 may generate and present an alert. As depicted in FIG. 2, operator 108 may be presented with a visual alert from output component 214a and an audio alert from output component 214b.

As mentioned above, FIG. 3 illustrates a method for evaluating a position of a musical instrument. Method 300 may be an example of one manner in which the position of a musical instrument may be evaluated. Method 300 may be performed to evaluate the position of a musical instrument, such as, for example, instrument 102 in FIGS. 1-2. In particular, method 300 may be performed using, for example, device 104 in FIGS. 1-2.

The method 300 may begin in step 302 and may continue to step 305. At step 305, the device may receive information about a reference position for instrument 102. The reference position may comprise a reference location, a reference orientation, or both. The reference position may correspond to the proper holding position of instrument 102 for operator 108. One or more reference positions may be preloaded into the memory of device 104. In some embodiments, a preloaded reference position may be provided by a manufacturer of at least one of the components of device 104, a manufacturer of instrument 102, or any other suitable source. A reference position may also be received by one or more devices of device 104 as user input. For example, a music instructor and/or operator 108 may selectively record a desired position as a reference position. In some embodiments, recording a desired position may utilize functions of one or more sensors (e.g., sensor 202) of device 104. Although this disclosure describes particular ways of establishing a reference position, this disclosure recognizes that the reference position may be established in any suitable manner. If more than one reference position is saved to memory of device 104, a user (e.g., operator 108 or a music instructor) may select a particular reference position and information about the particular reference position is received by device 104 in step 305. In some embodiments, the method 300 may continue to step 310.

At step 310, device 104 receives information about an allowed deviation. As mentioned above, an allowed deviation refers to an acceptable variance from a reference position and may include a distance component and/or a time component. The distance component may refer to a distance between a detected position of instrument 102 and a reference position. In contrast, the time component may refer to a temporal length in which instrument 102 is held in an improper position. The allowed deviation may provide forgiveness for insignificant adjustments in position. In some embodiments, memory of device 104 may be preloaded with one or more allowed deviations. For example, memory of device 104 may be preloaded with the following allowed deviations: +/−0°, +/−3°, +/−5°, +/−15°. The preloaded allowed deviations may be provided by a manufacturer of at least one of the components of device 104, a manufacturer of instrument 102, or any other suitable source. In other embodiments, one or more allowed deviations may be received as user input. In some embodiments, device 104 may receive information about a particular allowed deviation at step 310 (e.g., when more than one allowed deviation is stored in memory). A user may select a particular allowed deviation based on instrument 102, identity of operator 108, age of operator 108, skill of operator 108, or any other suitable reason. For example, a user may select an allowed deviation of +/−0° when operator 108 is an expert musician and wants to be alerted of every incidence of improper positioning. As another example, a user may select an allowed deviation of +/−15° when operator 108 is a 5 year-old novice musician. In some embodiments, the method 300 may continue to step 315.

At step 315, device 104 receives information about a position of instrument 102. In some embodiments, this information is detected by a position analyzer of device 104. In one embodiment, information about the position of instrument 102 is detected by a mercury tilt switch (e.g., mercury tilt switch may detect changes in orientation). In another embodiment, information about the position of instrument 102 is detected by one or more sensors (e.g., sensor 202 of FIG. 2). Device 104 may receive information about the position of instrument 102 at any given time. The information about the position of instrument 102 may comprise information about one or more of a location or an orientation of instrument 102. A location, such as the location of instrument 102, may be an n-dimensional point in space. An orientation, such as the orientation of instrument 102, may be an angular position relative to one or more axes (e.g., x-axis 208, y-axis 210, and z-axis 212 of FIG. 2). In some other embodiments, the received position information may identify or may be used to compute an orientation or a degree of movement of the musical instrument relative to one or more axes.

In some embodiments, the position of instrument 102 may be defined relative to a coordinate system (e.g., coordinate system 206 of FIG. 2). As depicted in FIG. 2, coordinate system 206 may be a three-dimensional coordinate system defined by three axes, such as x-axis 208, y-axis 210, and z-axis 212. In other embodiments, coordinate system 206 may be a one-dimensional coordinate system defined by a single axis, a two-dimensional coordinate system defined by two axes, a polar coordinate system, a cylindrical coordinate system, a spherical coordinate system, or any other suitable coordinate system. Although this disclosure describes and depicts identifying the position of instrument 102 using different types of coordinate systems, this disclosure recognizes that the position of instrument 102 may be identified in any suitable manner.

The origin of coordinate system 206 may be preset. In some embodiments, the origin of coordinate system 206 may be preset as a location on device 104, a location defined by user input received at one or more sensors, or any other suitable location. In other embodiments, the origin of coordinate system 206 may be provided by a manufacturer of device 104 or received from any suitable source. In yet other embodiments, the origin of coordinate system 206 may be set based on information obtained using a corresponding device (not shown). The corresponding device may be coupled to operator 108 in some embodiments. This sensor may be configured to generate information about the position of operator 108 and transmit this information to the position analyzer of device 104. The position analyzer may use this information to identify a position of instrument 102 relative to operator 108. In other embodiments, the corresponding device coupled to operator 108 may comprise one or more markers (not shown) coupled to operator 108 in FIG. 1. For example, without limitation, position analyzer may use one or more markers coupled to operator 108 to identify a position of instrument 102 relative to the one or more markers, and thereby operator 108. A marker may be, for example, without limitation, a visual marker, an electromagnetic marker that sends out an electromagnetic signal that can be received by position analyzer, or any other suitable marker. Although various ways of establishing the origin of coordinate system 206 have been described, this disclosure recognizes that the origin of coordinate system 206 may be established in any suitable manner. After receiving information about the position of instrument 102, the method 300 may continue to a determining step 320.

At step 320, device 102 determines whether instrument 102 is in a proper position. In some embodiments, determining whether instrument 102 is in the proper position comprises determining whether the position of instrument 102 is within the allowed deviation from the reference position. In some embodiments, this determination is performed by the position analyzer of device 104 and is based on the received information about the reference position, the allowed deviation, and the position of instrument 102. If device 104 determines that the position of instrument 102 is proper, the method 300 continues to an end step 332. In contrast, if device 104 determines that the position of instrument 102 is not proper, the method 300 may continue to step 325.

As mentioned above, determining whether the position of instrument 102 is proper may comprise determining whether the position of instrument 102 is within the allowed deviation from the reference position. In some embodiments, this determination may comprise determining a range of allowable positions for instrument 102 and determining whether the position of the musical instrument comprises one of the allowable positions. As an example, device 104 may receive (at step 305) information that the reference position is X° and receive (at step 310) information that the allowed deviation is +/−3°. If, at step 315, device 104 receives information that the position of instrument 102 is X°+2, device 104 may determine (at step 320) that the position of instrument 102 is proper. Effectively, the allowed deviation creates a range of positions for instrument 102 that are proper. Taking the above example, any position within X°−3° and X°+3° is a desirable (or proper) position for instrument 102. Thus, as long as the position of instrument 102 is within the range of proper positions, device 104 may determine that the position of instrument 102 is proper. If however device 102 determines that the position of instrument 102 falls outside of the range of proper positions, device 104 may determine that the position of instrument 102 is improper. Using the reference position and the allowed deviation from the example above, if at step 315 device 104 receives information that the position of instrument 102 is X°−6, device 104 may determine that the position of instrument 102 is improper because the position of instrument 102 is outside of the range of allowed positions (e.g., X°+/−3°).

As mentioned above, if device 104 determines at step 320 that the position of instrument 102 is improper, the method may continue to step 325. At step 325, device 102 generates an alert. In some embodiments, the position analyzer of device 102 generates the alert. As an example, when the position analyzer of device 102 is a mercury tilt switch, an alert may be generated when the circuit is closed (e.g., when mercury tilt switch is oriented such that the mercury contacts the metal electrodes). Generating an alert with a mercury tilt switch may comprise generating an electrical signal. As another example, when the position analyzer of device 102 comprises a processor, the processor may generate an electrical signal and/or a communications link. The alert may comprise one or more of a visual alert, an audio alert, a tactile alert, or an electrical signal. Although this disclosure describes specific types of alerts, this disclosure recognizes that the generated alert may be any suitable alert. In some embodiments, the method 300 continues to a step 330.

At step 330, device 104 presents the generated alert. Presenting the alert may permit a user (e.g., operator 108 and/or music instructor) to identify when operator 108 is holding instrument 102 in a proper or an improper position. As described above, the alert may be presented via one or more output components 214 (e.g., output component 214a, 214b of FIG. 2). Output component 214 may be a visual device, an audio device, and/or a tactile device. The position analyzer may be communicably coupled to the one or more output components in some embodiments. Thus, the one or more output components may present the alert generated by the position analyzer. In some embodiments, output component 214 and position analyzer are integrated as a single unit (e.g., as depicted in FIG. 2). In other embodiments, output component 214 comprises its own unit and is physically connected to a position analyzer unit (e.g., using a cable). In yet other embodiments, output component 214 comprises its own unit and is wirelessly connected to a position analyzer unit. As an example, a position analyzer unit may be coupled to instrument 102 and wirelessly transmit generated signals to a display device (e.g., mobile device) across a room. In some embodiments, the method 300 continues to an end step 332.

This disclosure also recognizes that other embodiments may repeat one or more steps of method 300. For example, instead of terminating at step 332, the method 300 may continue to a step 305. Such method may repeat until operator 108 is finished practicing or playing instrument 102.

Device 104 may comprise various other benefits in addition to alerting a user when operator 108 is holding instrument 102 in an improper position. For example, device 104 may be configured to monitor and record position information for later use. As an example, information about the position of instrument 102 may be detected by one or more sensors 202 and the information may be stored in memory of device 103 (e.g., memory 404 of computer 400). The recorded information may then be displayed on an output device 214 (e.g., a visual device such as a mobile phone, tablet, or laptop). The recorded information may represent position information over a period of time and the processor may identify one or more instances during the period of time where improper positioning was detected. Thus, a user of device 104 may be presented with a graphical representation of instrument 102 and/or operator 108 position over a period of time.

As mentioned above, assembly 100 may include a corresponding device (not depicted) in some embodiments. The corresponding device may comprise one or more sensors and be configured to detect information about the position of operator 108. In one embodiment, operator 108 may affix such sensor to his/her shirt. Such sensor may provide an origin of a coordinate system for device 104. As such, detecting improper positioning of instrument 102 may be improved such that device 104 may account for corresponding adjustments in the movement of operator 108. In another embodiment, operator 108 may wear one or more gloves comprising five sensors corresponding to each finger of the one or more gloves. As such, information about the positioning of operator 108's fingers may be detected and/or recorded. This information, when used in combination with information about the position of instrument 102, may be used to determine whether operator 108 is playing the correct musical notes and/or whether operator 108 is operating a bow (and/or other accessories for instrument 102) properly. One of ordinary skill in the art will recognize these and other benefits of using device 104.

FIG. 4 illustrates an example of a computer system. In some embodiments, position analyzer may be or comprise computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As mentioned above, processor 402 may be configured to receive the information about the position of instrument 102, determine whether the position of instrument 102 is within the allowed deviation from the reference position, and generate an alert if the position of instrument 102 is outside the allowed deviation from the reference position. Processor 402 may also be configured to record information about the position of instrument 102 and/or information about the position of operator 108. Processor 402 may also be configured to receive user input such as one or more reference positions and/or one or more allowed deviations. Although this disclosure expressly describes select functions of processor 402, it will be understood that processor 402 may execute one or more of the functions described herein. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In some embodiments, various types of information may be stored to memory 404 or storage 406. For example, device 104 may store information about the position of instrument, information about the position of operator 108, one or more reference positions, one or more allowed deviations, one or more graphical recordings representing position of instrument 102 and/or position of operator 108 over a period of time. This disclosure recognizes that any suitable type of information detected or used by any component of device 104 may be stored in memory 404 or storage 406.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

The components of computer system 400 may be integrated or separated. In some embodiments, components of computer system 400 may each be housed within a single chassis. The operations of computer system 400 may be performed by more, fewer, or other components. Additionally, operations of computer system 400 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A device for evaluating a position of a musical instrument, the device comprising:
   one or more interfaces configured to receive a reference position for the musical instrument;
   a position analyzer configured to monitor the position of the musical instrument and generate an alert when the position of the musical instrument is outside of an allowed deviation from the reference position, the position analyzer comprising:
      a memory configured to store the reference position and the allowed deviation from the reference position for the musical instrument;
      one or more sensors configured to detect position information about the instrument, wherein the detected information comprises an orientation of the musical instrument relative to the reference position;
      a processor communicatively coupled to the memory and the one or more sensors, the processor configured to:
         receive the position information about the instrument;
         determine whether the position of the instrument is within the allowed deviation from the reference position; and
         generate an alert if the position of the instrument is outside the allowed deviation from the reference position; and
   an output component configured to present the alert.

2. The device of claim 1, wherein the reference position is selectively recordable.

3. The device of claim 1, wherein the memory is communicatively coupled to the one or more sensors and the memory is further configured to store the position information.

4. The device of claim 1, wherein:
the memory is further configured to store a plurality of reference positions and a plurality of allowed deviations; and
the one or more interfaces are configured to receive a selection of one or more from the set comprising:
a reference position of the plurality of reference positions; and
an allowed deviation of the plurality of allowed deviations.

5. The device of claim 4, wherein the reference position and the allowed deviation are selected based on at least from the set comprising:
the musical instrument;
an operator of the musical instrument;
an age of the operator of the musical instrument; and
a level of skill of the operator.

6. The device of claim 1, wherein the alert comprises at least one from the set comprising: a visual alert, an audio alert, a tactile alert, and an electrical signal.

7. The device of claim 1, further comprising a fastener configured to couple the device to the musical instrument.

8. The device of claim 1, wherein the one or more sensors are configured to detect a change in position of at least one of the six degrees of freedom.

9. A system comprising:
a position analyzer configured to monitor a position of a musical instrument and generate an alert when the position of the musical instrument is outside of an allowed deviation from a reference position for the musical instrument, wherein the position analyzer comprises:
an interface configured to receive the reference position for the musical instrument;
a memory configured to store the reference position and the allowed deviation from the reference position for the musical instrument;
one or more sensors configured to detect position information about the position of the musical instrument;
a processor communicatively coupled to one or more of the memory, the one or more sensors, and the interface;
an output component configured to present the alert, wherein the alert comprises at least one of a visual alert, an audio alert, a tactile alert, or an electrical signal; and
a fastener configured to couple the position analyzer to the musical instrument.

10. The system of claim 9, wherein the position of the musical instrument comprises an orientation of the musical instrument relative to the reference position.

11. The system of claim 9, further comprising:
a corresponding device coupled to an operator of the musical instrument, the corresponding device comprising one or more sensors configured to detect information about a position of the operator; and
wherein:
the processor is further configured to receive the information about the position of the operator; and
determining whether the position of the musical instrument is within the allowed deviation from the reference position is based at least in part on the information about the position of the operator.

12. A method for evaluating a position of a musical instrument, the method comprising:
selectively recording a reference position;
receiving a first information, wherein the first information comprises information about a position of a musical instrument;
determining whether the position of the musical instrument is within an allowed deviation from the reference position;
in response to determining that the position of the musical instrument is outside the allowed deviation from the reference position, generating an alert; and
presenting the alert on an output component.

13. The method of claim 12, wherein the output component comprises at least one of a display device, an audio device, a tactile device, a mobile phone, a tablet, or a laptop.

14. The method of claim 12, wherein the first information is detected by at least one sensor, the at least one sensor comprising at least one of the set comprising:
an accelerometer;
a gyroscope;
an electromagnetic sensor;
an ultrasonic sensor;
a transducer; and
a marker.

15. The method of claim 12, further comprising:
receiving a selection of at least one from the set comprising:
the reference position from a plurality of reference positions; and
the allowed deviation from a plurality of allowed deviations.

16. The method of claim 12, wherein determining whether the position of the musical instrument is within the allowed deviation from the reference position comprises:
receiving a second information, wherein the second information comprises information about a position of an operator;
determining a relative position of the instrument, wherein the relative position of the instrument comprises a position of the instrument relative to a position of the operator, the relative position based on the first information and the second information; and
determining whether the relative position of the instrument is within the allowed deviation from the reference position.

17. The method of claim 12, wherein the alert comprises at least one a set comprising:
a visual alert;
an audio alert;
a tactile alert; and
an electrical signal.

18. The device of claim 1, wherein one or more of the interfaces, memory, sensors, processor, and output is a computer system.

19. The system of claim 9, wherein one or more of the interface, memory, sensors, processor, and output is a computer system.

* * * * *